United States Patent [19]
Bolton et al.

[11] 3,912,092
[45] Oct. 14, 1975

[54] TRACTOR LIFT

[76] Inventors: Floyd G. Bolton; Louis A. Bolton, both of Rte. 2 Box 28, Grand Prairie, Tex.

[22] Filed: Mar. 13, 1974

[21] Appl. No.: 450,600

[52] U.S. Cl. ............ 214/75 R; 37/117.5; 37/DIG. 3; 214/766
[51] Int. Cl.² .......................................... B60P 1/46
[58] Field of Search .......... 214/766, 767, 780, 85.5, 214/145, 450, 75 R; 298/1 A; 37/117.5, DIG. 3

[56] References Cited
UNITED STATES PATENTS

| | | | |
|---|---|---|---|
| 2,433,019 | 12/1947 | Arps | 214/766 X |
| 2,487,305 | 11/1949 | Bridegroom | 214/85.5 |
| 2,812,082 | 11/1957 | Meldahl | 214/780 X |
| 3,375,595 | 4/1968 | Beltrami | 37/117.5 |
| 3,587,887 | 6/1971 | Carli | 214/145 |
| 3,804,263 | 4/1974 | Castonguay | 214/450 X |

*Primary Examiner*—Robert R. Song
*Assistant Examiner*—Michael J. Forman

[57] ABSTRACT

The specification discloses a lift for a tractor having a three-point hitch and comprising a bed having a ramped shaped rear end structure, forward end structure extending upward from the forward end of the bed and side members connected to opposite edges of the bed and to the forward end structure whereby the tops of the side members slope downward from the top of the forward end toward the bed at the rear end of the lift. A carrier frame is provided to be connected to the three-point hitch of the tractor and for holding the lift in a lifting or hauling position or for allowing the rear end of the lift to swing downward for dumping purposes. In addition, there is provided a winch comprising a post which is adapted to be held by the lift on the inside thereof and which has an outward extending reel arm which may be located in different angular positions relative to the post of the winch. Also provided are two right triangular shaped sides adapted to be connected to the sloping tops of the side members to form a box-like lift which also includes a gate adapted to be secured to the rear end thereof.

1 Claim, 7 Drawing Figures

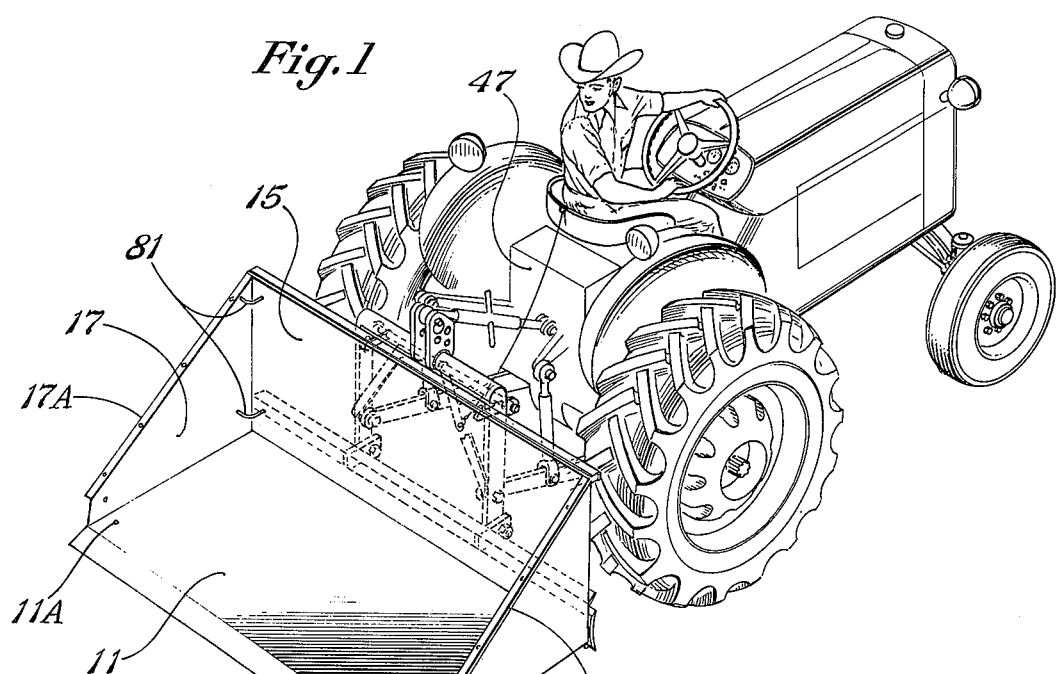
Fig.1
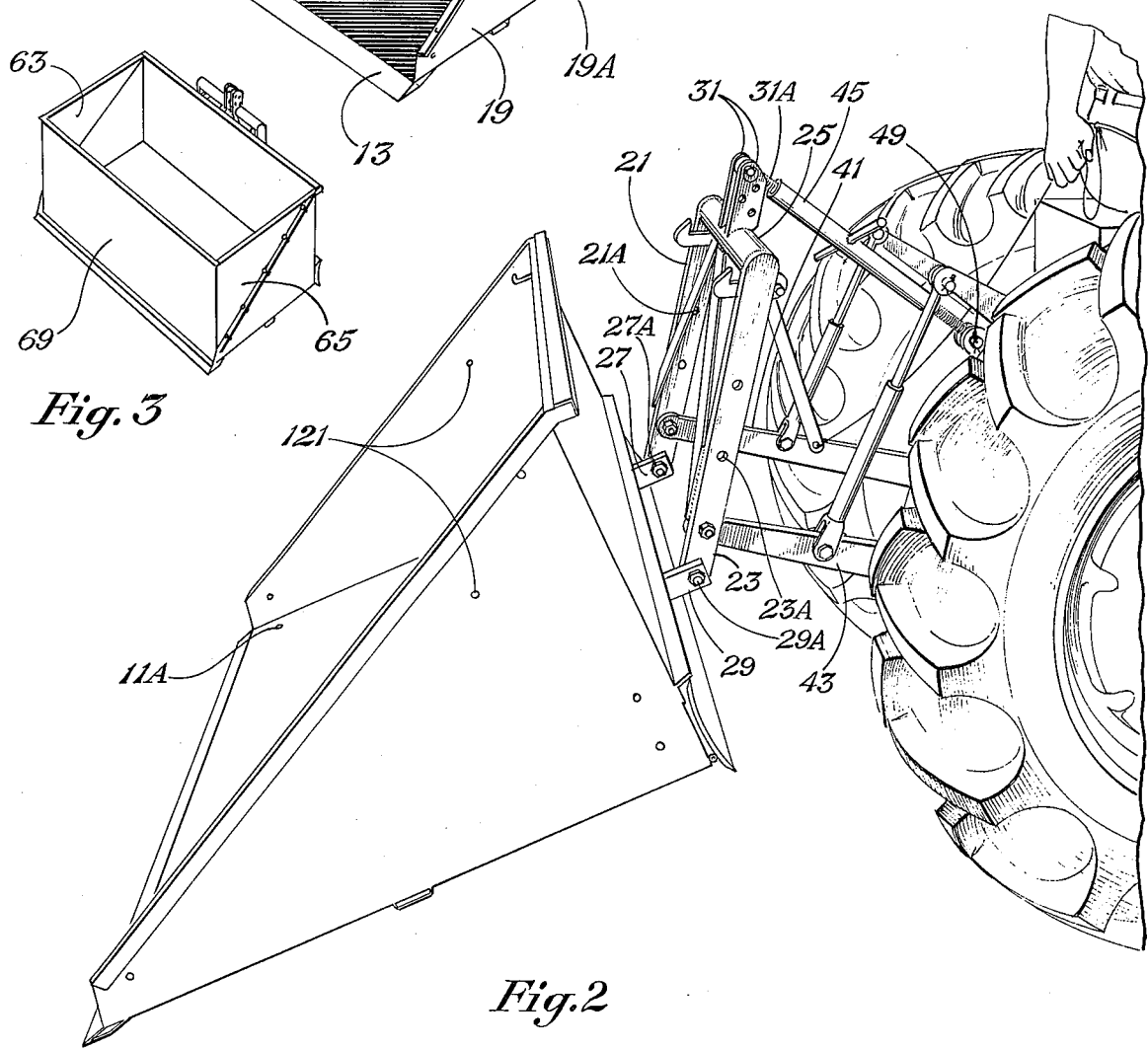
Fig.3
Fig.2

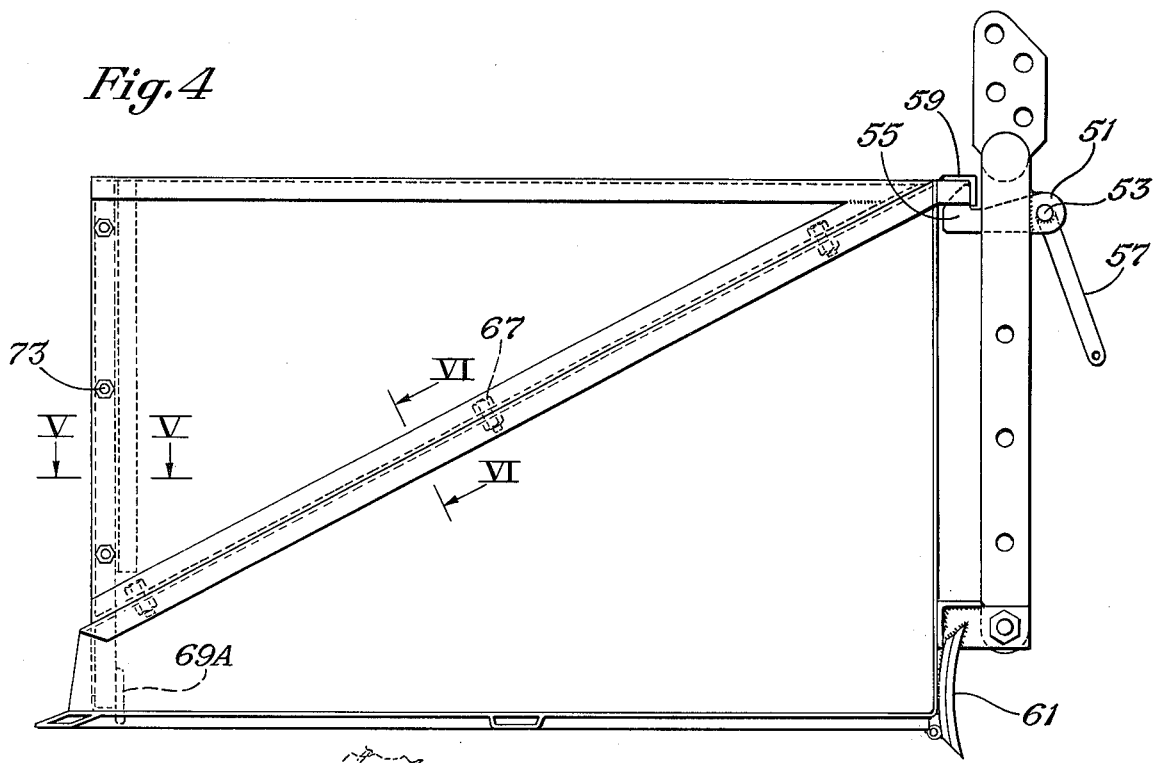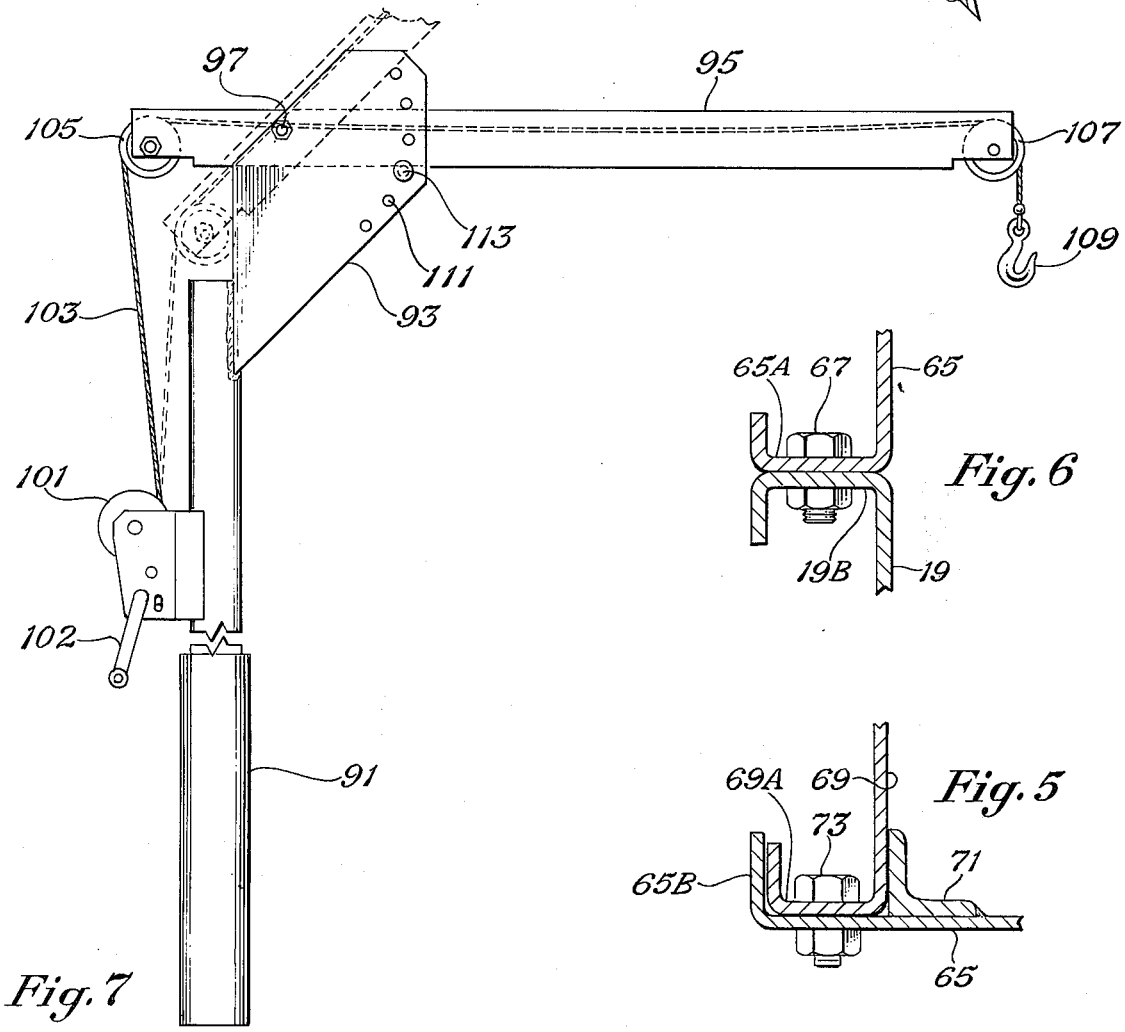

TRACTOR LIFT

SUMMARY OF THE INVENTION

It is an object of the present invention to provide a lift for a tractor having a three-point hitch connected to its rear end and including a central linkage and two spaced linkages, the latter of which are operated by a hydraulic system so as to raise or lower the two spaced linkages. The tractor lift comprises a bed having a forward end and a ramped shaped rear end sloping from the top downward to the bottom side of the bed. Forward end structure extends upward from the forward end of the bed and side members are connected to opposite side edges of the bed and to the forward end structure whereby the tops of the side members slope downward from the top of the forward end toward the bed at the rear end of the lift. A carrier frame is provided comprising two arms having a cross member connected to first ends thereof with opposite ends of the arms being pivotally connected to the lower forward end of the lift. Means is provided for connecting the carrier frame to the three-point hitch of the trailer. In addition, means is provided for detachably connecting the upper end of the carrier frame to the upper forward end of the lift to allow the lift to be secured to both the top and bottom ends of the carrier frame or to allow the rear end of the lift to swing downward when the upper forward end of the lift is released from the upper end of the carrier frame. In addition, there is provided a blade secured to the lower forward end of the lift for use for grading purposes.

In a further aspect, there is provided winch holding means for securing a winch to the forward end of the lift on the inside thereof. The winch comprises a post adapted to be held by the winch holding means in a vertical position and an arm having a first end pivotally coupled to the upper end of the post and a free end for holding a reel. In addition, means is provided for securing the winch arm in different angular positions relative to the post from a range which extends from a position wherein said winch arm extends upward forming an obtuse angle relative to the post to a position wherein said winch arm extends downward forming an acute angle relative to the post.

In another aspect, there is provided two right angled triangular shaped side members adapted to have their sloping edges coupled to the top sloping edges of the first side members to form a box-like lift. Rear gate means is adapted to be held by the rear ends of said triangular shaped side members.

BRIEF DESCRIPTION OF THE DRAWINGS

FIG. 1 is a perspective view of the lift attached to a tractor in a position for hauling, transporting, scooping, grading, etc.;

FIG. 2 is another view of the lift when swung down to a dumping position;

FIG. 3 is a perspective view of the lift with two additional side members and a gate which are employed to form a box-like lift;

FIG. 4 is a side view of the lift of FIG. 3;

FIG. 5 is a cross-sectional view of FIG. 4 taken through the lines 5—5 thereof;

FIG. 6 is a cross sectional view of FIG. 4 taken through the lines 6—6 thereof; and FIG. 7 illustrates a winch which may be secured to the lift.

DETAILED DESCRIPTION OF THE INVENTION

Referring to FIGS. 1 and 2, the lift comprises a bed 11 having a ramped shaped rear end 13 sloping downward from the top of the bottom and an upward extending wall 15 connected to the forward end of the bed. Two side walls 17 and 19 are connected to opposite side edges of the bed 11 and to opposite side edges of the forward wall 15 to form two side members whose tops 17a and 19a slope downward from the top of the forward wall 15 toward the bed at the rear end of the lift.

A carrier frame is provided for coupling the lift to the three-point hitch of the tractor. The carrier frame comprises two arms, 21 and 23, having a cross member 25 connected to the upper ends thereof and lower ends pivotally coupled to support bars 27 and 29 which are connected to and extend outwardly from the lower end of wall 15. Bolts 27a and 29a are employed to pivotally couple the lower ends of the arms 21 and 23 to the bars 27 and 29. Spaced plates 31 are connected to and extend upward from the cross bar 25. The carrier frame is connected to linkages 41, 43, and 45 which form a conventional three-point hitch of a tractor. Linkages 41 and 43 may be raised or lowered by a hydraulic lift 47 mounted to the rear of the tractor. The linkage 45 is pivotally coupled to the rear of the tractor by way of a pivot assembly illustrated at 49. Linkages 41 and 43 are connected to the arms 21 and 23 while linkage 25 is connected to the plates 31. Connection is by way of bolts, as illustrated. Arms 21 and 23 have spaced apertures 21a and 23a to allow the linkages 41 and 43 to be connected to the arms at different positions. Similarly, plates 31 have spaced apertures 31a to allow the linkage 45 to be coupled thereto at different positions.

Connected to arms 21 and 23 are rearwardly extending members 51 having apertures formed therethrough and which is rotatably located a rod 53. Note FIG. 4. Rigidly secured to the rod 53 is a hook 55 and a handle 57. The hook is adapted to hook onto an angle iron 59 connected to the forward top end of the lift whereby the forward end of the lift may be connected to the top and bottom ends of the carrier frame held by the three-point hitch whereby the lift may be used for hauling, transporting, scooping or grading. Light grading operations may be carried out by the use of a blade 61 connected to the lower forward end of the wall 15 and which extends downward below the bottom end of the bed 11. By rotating the handle 57 counterclockwise, as seen in FIG. 4, the hook 55 may be disengaged from the angle iron 59 to allow the rear end of the lift to swing downward for dumping purposes.

There are provided also two right triangled side members 63 and 65 adapted to have their hypotenuse or sloping edges connected to the top sloping edges 17a and 19a of the sides 17 and 19 to form a box-like lift, as illustrated in FIGS. 3 and 4. Connection of the side members 63 and 65 to side members 17 and 19 is by way of bolts 67 which are adapted to extend through apertures formed through outward extending flanges of the side members 63, 65, and 17, 19. The flanges of side members 65 and 19 are illustrated at 65a and 19a in FIG. 6. Also provided is a gate 69 which is adapted to be held by and secured to the side members 63 and 65. The rear ends of the side members 63 and 65 have slots into which the gate 69 may be fitted for holding it in place. As illustrated in FIG. 5, the slot of side member 65 is formed by an angle iron 71 attached on the inside of side member 65 and a flange 65b extending inwardly. Connected to the lower ends of the gate are two dowels 69a which are adapted to fit within apertures 11a at the rear end of the bed when the gate is moved downward to its completely closed position. In addition, bolts 73 may be inserted through apertures formed through flanges 69a of the gate and through the rear ends of the side members 63 and 65 for securely holding the gate in its slots. With this arrangement, the gate may be held at different levels relative to the bed 11 to allow sand, dirt, etc. being hauled by the lift to be spread.

Connected to the forward inside corners on each side of the lift are a pair of rings 81 into which may be inserted a post 91 of a hoist or winch may be employed to pull or lift objects onto the lift or to remove objects from the lift. As illustrated in FIG. 7, the hoist comprises two spaced plates 93 connected to the post 91 and to which one end of a rectangular tubular shaped boom or arm 95 is pivotally coupled by way of a bolt 97. A drum 101, operated by a handle 102, is secured to the post for reeling in and out a cable or rope 103 having one end connected to the drum. It is to be understood that the drum may be operated by an electric motor driven by the vehicle's electrical system. The cable or rope extends around reels or pulleys 105 and 107 coupled to the boom and has a hook 109 attached to its free end. The plates 93 have a plurality of spaced apertures 111 through which a bolt 113 may be extended for locating the boom or arm 95 in different angular positions relative to the post 95. For example, the arm 95 may be located at an angle of 90° relative to the post 91 by placing the bolt 113 in the position shown. By placing the bolt 113 in the uppermost aperture 111, the arm 95 may be located to extend upward at an obtuse angle relative to the post 91. By locating the bolt 113 in the lowermost aperture 111, the arm 95 may be supported to extend downward at an acute angle relative to the post 91. This arrangement provides great flexibility for loading or unloading objects onto or from the lift particularly if it is desired to pull a heavy object directly onto the lift. In this respect, the bolt 113 may be located in the lowermost aperture 111 with the arm 95 located between the post 91 and the bolt 113 to allow the arm to extend downwardly thereby facilitating pulling of objects onto the lift. When it is not desired to use the winch, it may be removed by lifting it out of the slots or apertures formed by the rings 81. In one embodiment, the arm or boom 95 may be adjusted to be raised to an angle of 45° extending upward from the horizontal position or downward to an angle of about 30° relative to the vertical post 91.

Referring to FIG. 2, there are also provided two apertures 121 formed in the side members 17 and 19 and which may be employed to hold a rod for supporting a number of spools of wire. With this arrangement, the lift may be used as a wire layer when constructing, for example, fences.

Thus, it can be understood that the lift of the present invention is very flexible and hence has many uses. For example, the lift, when attached to the tractor, may be employed to transport equipment, materials, dirt, etc. or, for example, to load and unload a pickup truck. It may also be employed as a shovel or a scoop for cleaning purposes by lowering the lift to ground level and backing up the tractor to scoop dirt upon the bed by way of the ramp end 13. With the blade 61, it can be used as a light grader and can be used for supporting spools of wire for laying wire, as mentioned above. By use of the additional sides 63 and 65 and the gate 69, it may be employed to transport animals and by raising the tailgate, it can be used to spread dirt, etc. By use of the winch, heavy objects may be readily loaded or unloaded onto or from the lift. In addition, by use of the winch, animals stuck in mud in remote places may be easily removed. By the use of the dump arrangement including the hook 55 and the handle 57, dirt being carried may be readily dumped where desired. In addition, by attaching the lift to the back of the tractor, it can be employed to keep the tractor from tilting backward when going up a hill.

We claim:

1. A lift for a tractor having a three-point hitch connected to its rear end and including a central linkage and two spaced linkages, the latter of which are operated by a hydraulic system so as to raise or lower the two spaced linkages, said lift comprising:

a bed having a forward end and a rear end, said bed having a ramped shaped rear end sloping from the top downward to the bottom side of said bed, forward end structure extending upward from the forward end of said bed, side members connected to opposite side edges of said bed and to said forward end structure whereby the tops of said side members slope downwardly from the top of the forward end toward the bed at the rear end of said lift, a carrier frame comprising two arms having a cross member connected to first ends thereof, the opposite ends of said arms being pivotally connected to the lower forward end of said lift, means for connecting said carrier frame to the three-point hitch of the tractor, means for detachably connecting the upper end of said carrier frame to the upper forward end of said lift to allow said lift to be secured to both the top and bottom ends of said carrier frame or to allow the rear end of said lift to swing downward when the upper forward end of said lift is released from the upper end of said carrier frame, a blade secured to the lower forward end of said lift and projecting downward below said bed for use for grading purposes, winch holding means for securing a winch to the forward end of said lift, a winch, said winch holding means being adapted to secure the winch on the inside of said lift, said winch comprising:

a post adapted to be held by said winch holding means in a vertical position, an arm having a first end pivotally coupled to the upper end of said post and a free end for holding a reel, and means for securing said winch arm in different angular positions relative to said post from a range which extends from a position wherein said winch arm extends upward forming an obtuse angle relative to said post to a position wherein said winch arm extends downward forming an acute angle relative to said post,
right angled triangular shaped side members adapted to have their sloping edges coupled to the top sloping edges of said first side members to form a box-like lift, and rear gate means adapted to be held by the rear ends of said triangular shaped side members.

* * * * *